United States Patent
Do et al.

(10) Patent No.: US 11,011,960 B2
(45) Date of Patent: May 18, 2021

(54) WOUND ROTOR MOTOR FOR VEHICLE

(71) Applicants: Hyundai Motor Company, Seoul (KR); Kia Motors Corporation, Seoul (KR)

(72) Inventors: Sang Hwa Do, Gyeonggi-do (KR); Jae Bum Park, Gyeonggi-do (KR); Kyoung Bum Kim, Gyeonggi-do (KR); Yong Sung Jang, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 385 days.

(21) Appl. No.: 15/826,515

(22) Filed: Nov. 29, 2017

(65) Prior Publication Data
US 2019/0115805 A1    Apr. 18, 2019

(30) Foreign Application Priority Data

Oct. 13, 2017    (KR) .................. 10-2017-0133594

(51) Int. Cl.
*H02K 9/19*    (2006.01)
*B60L 50/16*    (2019.01)
(Continued)

(52) U.S. Cl.
CPC ............ *H02K 9/19* (2013.01); *B60L 50/16* (2019.02); *B60L 50/50* (2019.02); *H02K 3/12* (2013.01);
(Continued)

(58) Field of Classification Search
CPC .. H02K 3/12; H02K 3/18; H02K 5/20; H02K 9/193; H02K 9/197; H02K 3/24;
(Continued)

(56) References Cited

U.S. PATENT DOCUMENTS 2,524,269 A * 10/1950 Patterson ............... F04D 9/06
                                                  417/83
2,606,946 A *  8/1952 Fisher .................... H02K 9/19
                                                  310/54
(Continued)

FOREIGN PATENT DOCUMENTS

CN    103026597 A       4/2013
JP    2007116807 A  *  5/2007
(Continued)

OTHER PUBLICATIONS

Nakao (JP 2009071923 A) English Translation (Year: 2009).*
Nakao (JP 2007116807 A) English Translation (Year: 2007).*

*Primary Examiner* — Tulsidas C Patel
*Assistant Examiner* — Robert E Mates
(74) *Attorney, Agent, or Firm* — Mintz Levin Cohn Ferris Glovsky and Popeo, P.C.; Peter F. Corless

(57) ABSTRACT

A wound rotor motor is provided, in which a rotary shaft is arranged in the vertical direction, to immerse lower coil portions of a stator and a rotor in cooling oil, thereby improving the cooling effect beyond that of a conventional configuration, in which lower coil portions are partially immersed, and consequently decreasing the capacity of an oil pump. A wound rotor motor is provided, in which a rotary shaft is arranged in the vertical direction and has therein a flow passage, through which cooling oil moves up from the region below the rotor and is sprayed to the region above the rotor by centrifugal force generated by rotation of the rotor, thereby enhancing the motor-cooling effect, decreasing the frictional loss of the rotor due to the cooling oil, and consequently improving the operational efficiency of the motor.

4 Claims, 6 Drawing Sheets

(51) Int. Cl.
*B60L 50/50* (2019.01)
*H02K 3/12* (2006.01)
*H02K 3/18* (2006.01)

(52) U.S. Cl.
CPC ............ *H02K 3/18* (2013.01); *B60L 2220/14* (2013.01); *B60L 2220/54* (2013.01)

(58) Field of Classification Search
CPC ........ H02K 5/18; H02K 1/32; B60L 2220/14; B60L 2220/54; B60L 50/50
USPC ...................................... 310/61, 54
See application file for complete search history.

(56) References Cited

U.S. PATENT DOCUMENTS

| | | | |
|---|---|---|---|
| 3,659,674 A * | 5/1972 | Ferrario | F16C 33/6662 184/6.16 |
| 5,509,381 A * | 4/1996 | Fisher | F01M 9/108 123/196 R |
| 2013/0342045 A1 * | 12/2013 | Matsuki | H02K 9/19 310/54 |
| 2016/0164374 A1 * | 6/2016 | Yang | H02K 9/02 310/59 |

FOREIGN PATENT DOCUMENTS

| | | | |
|---|---|---|---|
| JP | 2009071923 A * | 4/2009 | |
| KR | 2015-0064624 A | 6/2015 | |

* cited by examiner

[ SECTION A-A ]

[ SECTION B-B ]

⇨ FLOW DIRECTION OF COOLING OIL

WOUND ROTOR MOTOR FOR VEHICLE

CROSS-REFERENCE TO RELATED APPLICATION

This application claims under 35 U.S.C. § 119(a) the benefit of priority to Korean Patent Application No. 10-2017-0133594 filed on Oct. 13, 2017, the entire contents of which are incorporated herein by reference.

BACKGROUND

(a) Technical Field

The present disclosure relates to a wound rotor motor for a vehicle, and more particularly, to a wound rotor motor for a vehicle, which has an improved cooling structure suitable for use as a driving source of a vehicle.

(b) Background Art

In general, an electric vehicle or a hybrid vehicle may include an electric motor, which generates driving torque required to drive the vehicle by converting electrical energy into rotational force. Among electric motors for use as a driving source of a vehicle, a wound rotor motor includes a coil is wound around a rotor as well as a stator and when a current is applied thereto, the rotor is electromagnetized and generates rotational force.

In this wound rotor motor, since a substantial amount of heat is generated due to the rotation, adequate cooling should be performed. When a conventional wound rotor motor is mounted to a vehicle, the rotary shaft thereof is arranged in the horizontal direction just like the rotation central axis of a wheel of the vehicle. Accordingly, only a portion of a stator core and a portion of a coil are immersed in and cooled by cooling oil due to the position of the coil wound around the stator core and gravity. Further, only a portion of the coil wound around a rotor is immersed in and cooled by the cooling oil. Thus, the wound rotor motor is not properly cooled. Therefore, to increase the effect of cooling the wound rotor motor, a structure of directly spraying cooling oil to the stator and the rotor using a high-pressure pump has been provided. However, spraying cooling oil onto the motor increases frictional loss of the rotor and consequently decreases the operational efficiency of the motor.

The above information disclosed in this section is merely for enhancement of understanding of the background of the invention and therefore it may contain information that does not form the prior art that is already known in this country to a person of ordinary skill in the art.

SUMMARY

The present invention provides a wound rotor motor for a vehicle, in which a rotary shaft, which operates as the rotational center of a rotor, is disposed in the vertical direction of a vehicle when mounted thereto, to immerse a plurality of lower coil portions arranged in the circumferential direction of a stator and a plurality of lower coil portions arranged in the circumferential direction of a rotor in cooling oil, thereby improving the cooling effect beyond that of a conventional configuration, in which lower coil portions are partially immersed in the cooling oil, and consequently making it possible to decrease the capacity of an oil pump.

It is another object of the present invention to provide a wound rotor motor for a vehicle, in which a rotary shaft, which operates as the rotational center of a rotor, is arranged in the vertical direction of a vehicle when mounted thereto, and includes therein a flow passage, through which cooling oil that is present in the region below the rotor moves up and is sprayed to the region above the rotor by centrifugal force generated by rotation of the rotor, thereby making it possible to enhance the motor-cooling effect, to decrease the frictional loss of the rotor due to the cooling oil, and consequently to improve the operational efficiency of the motor.

In one aspect, the present invention provides a wound rotor motor for a vehicle, that may include a stator having a plurality of stator coils arranged in the circumferential direction, a rotor disposed inward of the stator, the rotor having a plurality of rotor coils arranged in the circumferential direction, a rotary shaft arranged in the vertical direction of the vehicle, the rotary shaft operating as a rotational center of the rotor, and an oil chamber disposed below the stator and the rotor to store cooling oil therein. The cooling oil may be stored in the oil chamber to immerse the lower end portion of each of the stator coils and the lower end portion of each of the rotor coils in the cooling oil. In an exemplary embodiment, the wound rotor motor may further include an oil pump configured to spray the cooling oil to a hollow space formed above the rotor, and an upper plate configured to seal the hollow space, the upper plate having therein a plurality of apertures formed to allow the cooling oil sprayed from the oil pump to pass therethrough.

In another aspect, the present invention provides a wound rotor motor for a vehicle to generate driving torque through rotation of a rotor performed by electromagnetic force generated between the rotor and a stator, the wound rotor motor may include a rotary shaft arranged in the vertical direction of the vehicle, the rotary shaft operating as a rotational center of the rotor, a flow passage formed in the rotary shaft in the longitudinal direction of the rotary shaft, and cooling oil for cooling the motor, the cooling oil being guided through the flow passage and sprayed to a hollow space above the rotor by centrifugal force generated by rotation of the rotary shaft.

In an exemplary embodiment, the wound rotor motor may further include an upper plate disposed above the rotor to seal the hollow space, the upper plate having therein a plurality of oil discharge apertures. Each of the oil discharge apertures may be formed in the upper plate to be disposed in a line that is perpendicular to the axial direction of the rotary shaft. In another exemplary embodiment, the upper plate may have a guide rib disposed below the oil discharge apertures, and, of the cooling oil sprayed from the flow passage to the hollow space, cooling oil that is not discharged outside the upper plate through the oil discharge apertures may be guided toward rotor coils of the rotor by the guide rib.

In still another exemplary embodiment, the wound rotor motor may further include at least one inlet port formed in the rotary shaft to introduce the cooling oil into the flow passage, and a plurality of outlet ports formed in the rotary shaft to discharge the cooling oil from the flow passage, wherein the outlet ports may branch from the upper end of the flow passage and may extend to the outer circumferential surface of the rotary shaft. In yet another exemplary embodiment, the outlet ports may extend from the upper end of the flow passage to the outer circumferential surface of the rotary shaft to be inclined at a predetermined angle.

In still yet another exemplary embodiment, the wound rotor motor may further include an oil chamber disposed below (beneath) the stator and the rotor to store the cooling oil therein, the oil chamber communicating with the inlet port, wherein the cooling oil may be stored in the oil chamber to a predetermined height such that, of stator coils of the stator and rotor coils of the rotor, the lower end portion of each of the stator coils is immersed in the cooling oil.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
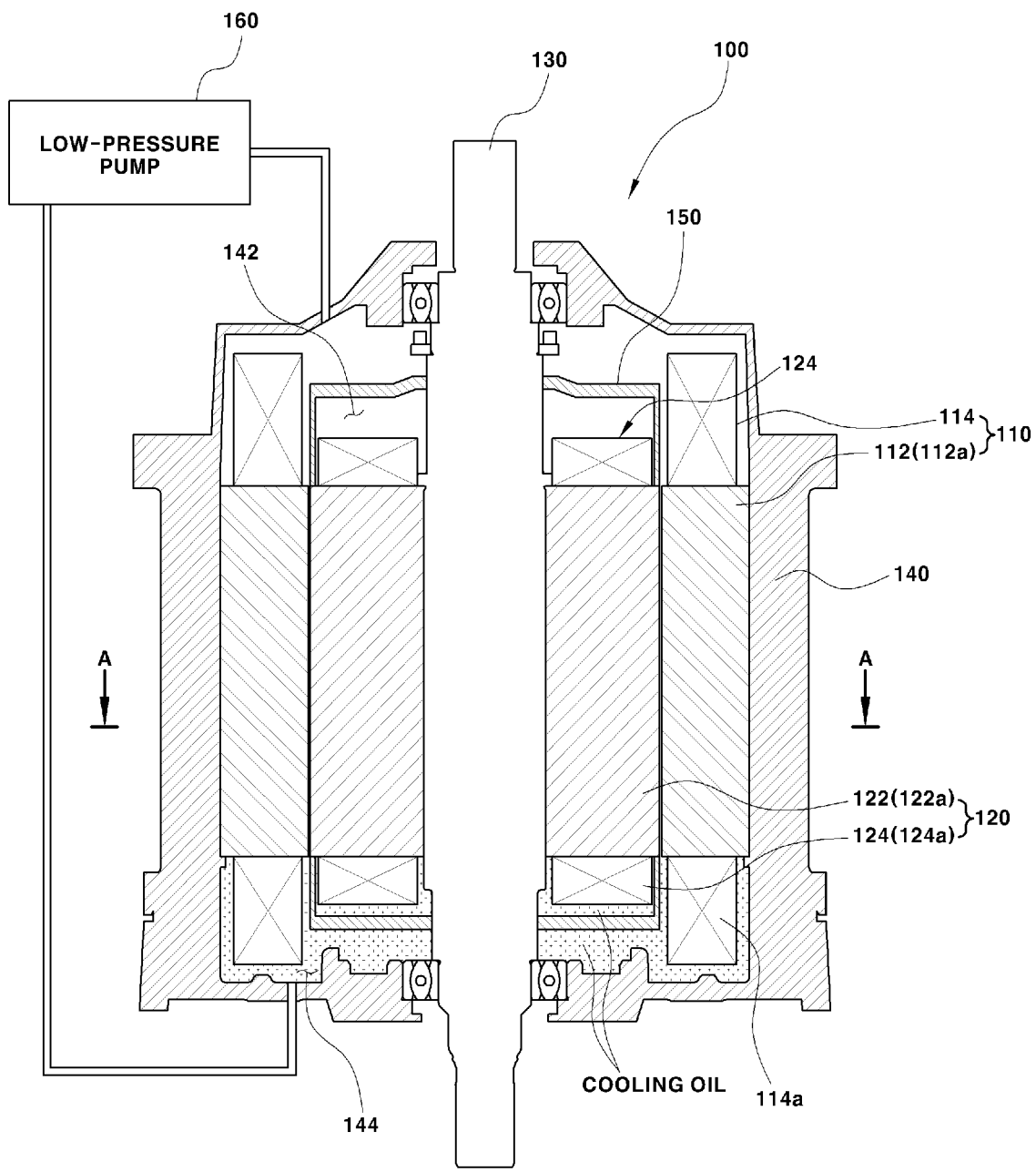
FIG. 1 is a view illustrating a wound rotor motor according to a first exemplary embodiment of the present invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes, will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, reference will now be made in detail to various exemplary embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

First, a description of a wound rotor motor according to a first exemplary embodiment of the present invention will now be made.

First Embodiment

Figure 2:
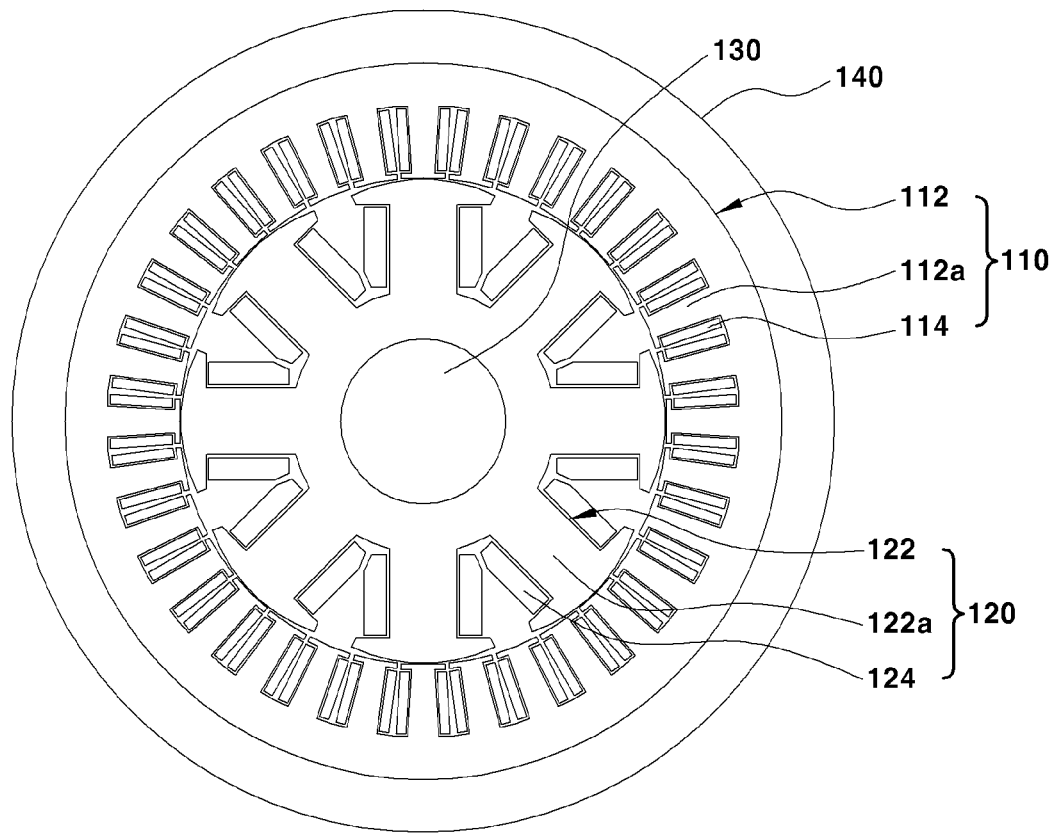
FIG. 2 is a sectional view taken along line A-A in FIG. 1 according to the first exemplary embodiment of the present invention.
Figure 3:
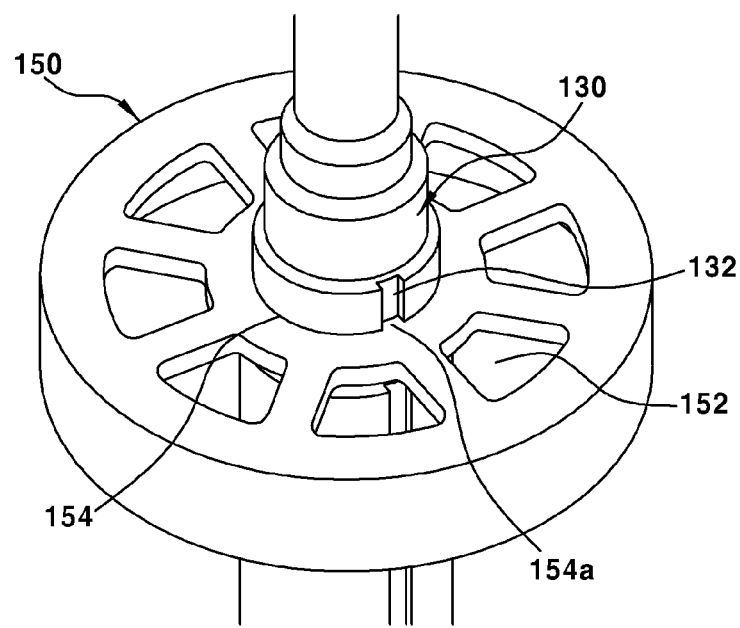
FIG. 3 is a view illustrating an upper plate coupled to a rotary shaft of the wound rotor motor according to the first exemplary embodiment of the present invention.

FIG. 1 is a view illustrating a wound rotor motor according to the first exemplary embodiment of the present invention, FIG. 2 is a sectional view taken along line A-A in FIG. 1, and FIG. 3 is a view illustrating an upper plate coupled to a rotary shaft of the wound rotor motor according to the first exemplary embodiment of the present invention.

The first exemplary embodiment of the present invention may include a rotary shaft 130, which operates as a rotational center of a rotor 120, disposed in the vertical direction of a vehicle to be perpendicular to the axial direction of wheels (e.g., drive wheels that rotate by receiving driving torque from the electric motor) of the vehicle, whereby a plurality of lower coil portions 114a provided at a stator 110 and a plurality of lower coil portions 124a provided at the rotor 120 may be immersed to a predetermined depth in cooling oil.

As shown in FIGS. 1 and 2, a wound rotor motor 100 according to the first exemplary embodiment of the present invention may include a stator 110, a rotor 120, a rotary shaft 130, and a case 140. The rotor 120 may be electromagnetized by the application of current thereto and may be configured to generate driving torque through rotation performed by electromagnetic attractive force and electromagnetic repulsive force generated between the rotor 120 and the stator 110. The stator 110 may include a stator core 112 and a plurality of stator coils 114 wound around the stator core 112. The stator core 112 may include a plurality of coil-winding portions 112a arranged in the circumferential direction. Each of the stator coils 114 may be wound around a respective one of the coil-winding portions 112a.

The rotor 120 may be include a rotor core 122 and a plurality of rotor coils 124 wound around the rotor core 122. The rotor core 122 may include a plurality of coil-winding portions 122a arranged in the circumferential direction. Each of the rotor coils 124 may be wound around a respective one of the coil-winding portions 122a. Additionally, the stator 110 may be disposed inside the hollow case 140, and the rotor 120 may be disposed inside the stator 110 to be spaced a predetermined distance apart from the stator 110.

The rotary shaft 130 may operate as a rotational center of the rotor 120. The rotary shaft 130 may be fitted into the inner circumferential surface of the rotor 120 (specifically, the inner circumferential surface of the rotor core) to rotate simultaneously with the rotor 120, and may extend straight (e.g., linearly) in the vertical direction when mounted to the vehicle. The rotary shaft 130 may be connected to wheels (e.g., drive wheels that rotate by receiving driving torque from the electric motor) of the vehicle to transmit power to the wheels. Since the structure for transmitting power to the drive wheels may employ a well-known power transmission structure, a detailed explanation thereof will be omitted.

The case 140 may enclose the stator 110 and the rotor 120 disposed outward of the rotary shaft 130 to seal the stator 110 and the rotor 120 from the outside. The rotary shaft 130, which operates as the rotational center of the rotor 120, may penetrate the case 140 in the vertical direction and may be rotatably supported by the case 140. The case 140 may enclose the stator coils 114, which are arranged longer in the vertical direction than the rotor coils 124, and thus, a predetermined gap may be formed in the vertical direction between the case 140 and the stator coils 114. A portion of the empty region above the rotor 120 within the case 140 may be referred to as a hollow space 142, and the empty region below the rotor 120 and the stator 110 may be referred to as an oil chamber 144, which is filled with cooling oil.

Furthermore, the cooling oil may be stored in the oil chamber 144 to immerse the lower coil portions 114a of the stator 110 and the lower coil portions 124a of the rotor 120 in the cooling oil. In particular, each of the lower coil portions 114a of the stator 110 refers to the lower end portion of each of the stator coils 114 wound around a respective one of the coil-winding portions 112a of the stator core 112, and each of the lower coil portions 124a of the rotor 120 refers to the lower end portion of each of the rotor coils 124 wound around a respective one of the coil-winding portions 122a of the rotor core 122. Described in more detail, each of the lower coil portions 114a of the stator 110 refers to a portion of each of the stator coils 114 that protrudes downwards from a respective one of the coil-winding portions 112a, and each of the lower coil portions 124a of the rotor 120 refers to a portion of each of the rotor coils 124 that protrudes downwards from a respective one of the coil-winding portions 122a. In other words, the lower coil portions 114a of the stator 110 are the portions of the stator coils 114 positioned below the coil-winding portions 112a, and the lower coil portions 124a of the rotor 120 are the portions of the rotor coils 124 that are positioned below the coil-winding portions 122a.

To allow the lower coil portions 114a of the stator 110 and the lower coil portions 124a of the rotor 120 to be immersed at the same height in the cooling oil, in other words, to allow the lower coil portions 114a of the stator 110 and the lower coil portions 124a of the rotor 120 arranged in the circumferential direction to be cooled under the same conditions, the rotary shaft 130 may be arranged in the vertical direction of the vehicle to be perpendicular to the axial direction of the wheels of the vehicle; however, the embodiment is not limited thereto. For example, the rotary shaft 130 may be arranged to be inclined at an angle within a predetermined range.

As shown in FIG. 1, since the lower coil portions 114a of the stator 110 protrude in the axial direction further than the lower coil portions 124a of the rotor 120, the cooling oil may be supplied to the oil chamber 144 to a height at which the lower coil portions 124a of the rotor 120 as well as the lower coil portions 114a of the stator 110 may be immersed in the cooling oil. To enhance the cooling effect using the cooling oil, an oil pump 160 may be disposed outside the case 140 to allow the cooling oil to move between the oil chamber 144 and the hollow space 142.

The oil pump 160 may be configured to pump the cooling oil to spray the same toward the hollow space 142 formed above the rotor 120. To pump the cooling oil from the oil chamber 144 and to spray the same to the region above the hollow space 142, the oil pump 160 may be disposed between the oil chamber 144 and the hollow space 142. The hollow space 142 is an empty space formed above the rotor 120 within the case 140. The hollow space 142 may be sealed by an upper plate 150, which is disposed above the rotor 120. In other words, in the space formed above the rotor 120 and the stator 110 within the case 140, the hollow space 142 may be a space formed above the rotor that is covered with the upper plate 150.

As shown in FIG. 3, the upper plate 150 may include a plurality of apertures 152 formed in the top surface thereof and disposed in the circumference direction to allow the cooling oil pumped and sprayed from the oil pump 160 to pass therethrough. The rotary shaft 130 may be fitted through a shaft-coupling aperture 154 formed in the upper plate 150 to bring the outer circumferential surface of the rotary shaft 130 into contact with the circumferential surface of the shaft-coupling hole 154 in the upper plate 150.

The upper plate 150 may include a plurality of latching protrusions 154a, which protrude from the circumferential surface of the shaft-coupling aperture 154 that comes into contact with the outer circumferential surface of the rotary shaft 130. The rotary shaft 130 may include a plurality of latching recesses 132, formed in the outer circumferential surface thereof that comes into contact with the circumferential surface of the shaft-coupling aperture 154. Each of the latching protrusions 154a of the upper plate 150 may be fitted into a respective one of the latching recesses 132 in the rotary shaft 130. Since the upper plate 150 is coupled to the rotary shaft 130 in a manner such that each of the latching protrusions 154a is fitted into a respective one of the latching recesses 132, the upper plate 150 may be able to rotate together with the rotary shaft 130.

It is desirable for the apertures 152 to be arranged to dispose each of the rotor coils 124 wound around the rotor core 122 directly below a respective one of the apertures 152. In other words, the apertures 152 may be arranged in the top surface of the upper plate 150 to disposed each of the rotor coils 124 wound around the rotor core 122 in a vertical line that passes through a respective one of the apertures 152.

Accordingly, the cooling oil sprayed from the oil pump 160 may be directly supplied to the rotor coils 124 through the apertures 152. In addition, although not illustrated in the drawings, the oil pump 160 may have a nozzle structure capable of evenly spraying the cooling oil to the apertures 152. In addition, it may also be possible to cool the rotor 120 using air that moves through the apertures 152 as well as the cooling oil that is introduced thereinto through the apertures 152.

As described above, the electric motor 100 of the present invention may include the rotary shaft 130 arranged in the vertical direction to immerse the lower coil portions 114a and 124a arranged in the circumferential direction of the stator 110 and the rotor 120 in the cooling oil, thereby improving the cooling effect beyond that of a conventional configuration, in which the lower coil portions 114a and 124a are partially immersed in the cooling oil (only some of the lower coil portions arranged in the circumferential direction are immersed in the cooling oil), cooling the rotor to a desired level by circulating an amount of cooling oil less than that pumped by an oil pump used in a conventional wound rotor motor, in which the rotary shaft is arranged in the horizontal direction, and consequently making it possible to decrease the pumping pressure and the capacity of the oil pump.

Hereinafter, a description of a wound rotor motor according to a second exemplary embodiment of the present invention will be made. In this exemplary embodiment, explanations that are duplicates of those of the wound rotor motor according to the first embodiment may be omitted.

Second Embodiment

Figure 4:
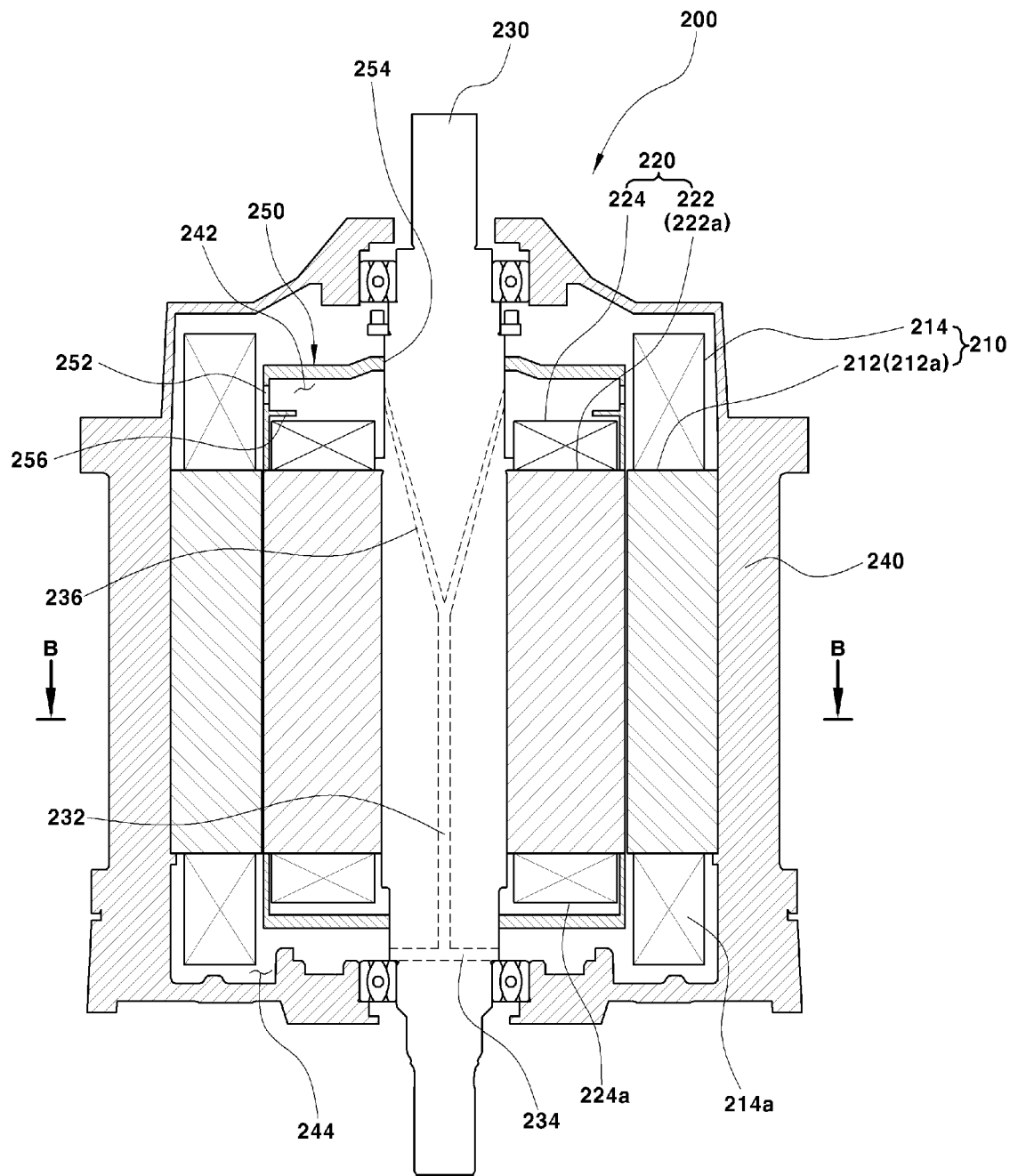
FIG. 4 is a view illustrating a wound rotor motor according to a second exemplary embodiment of the present invention.
Figure 5:
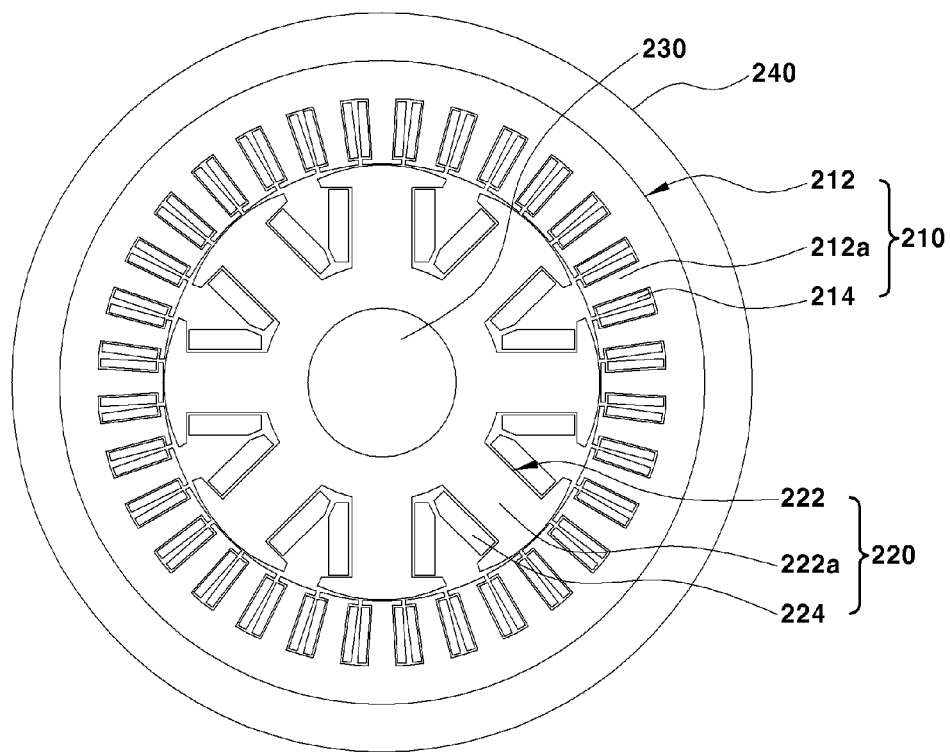
FIG. 5 is a sectional view taken along line B-B in FIG. 4 according to the second exemplary embodiment of the present invention.
Figure 6:
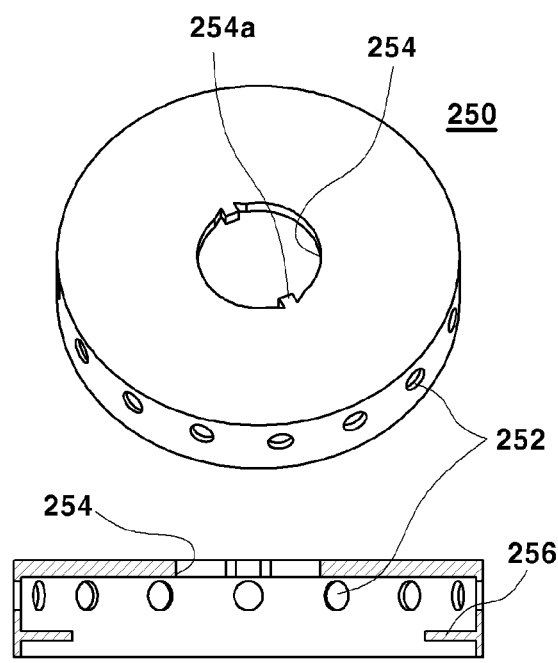
FIG. 6 is a view illustrating an upper plate of the wound rotor motor according to the second exemplary embodiment of the present invention.
Figure 7:
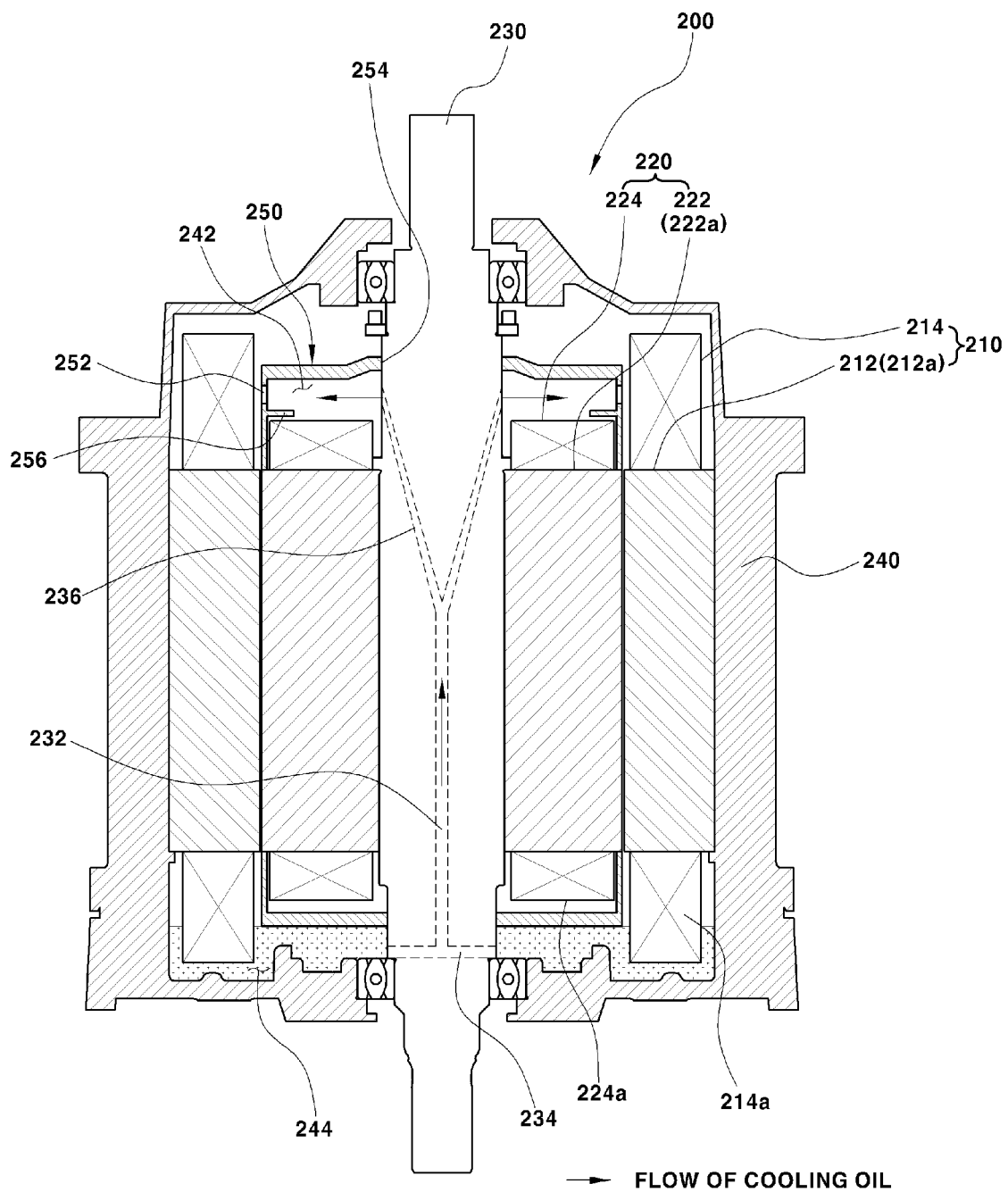
FIG. 7 is a view schematically showing the flow path of cooling oil of the wound rotor motor according to the second exemplary embodiment of the present invention.
Figure 8:
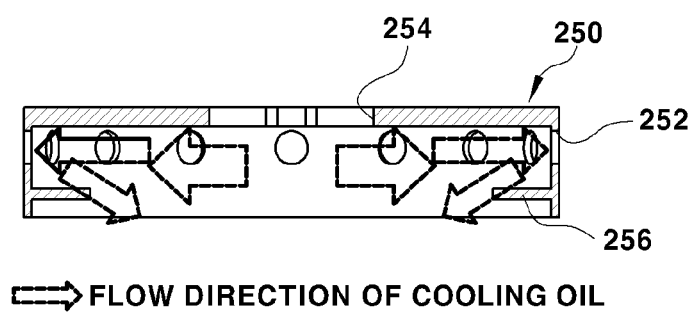
FIG. 8 is a view showing the flow of the cooling oil within the upper plate according to the second exemplary embodiment of the present invention.

FIG. 4 is a view illustrating the wound rotor motor according to the second exemplary embodiment of the present invention, FIG. 5 is a sectional view taken along line B-B in FIG. 4, FIG. 6 is a view illustrating an upper plate of the wound rotor motor according to the second exemplary embodiment of the present invention, FIG. 7 is a view schematically showing the flow path of cooling oil of the wound rotor motor according to the second exemplary embodiment of the present invention, and FIG. 8 is a view showing the flow of the cooling oil within the upper plate according to the second exemplary embodiment of the present invention.

The second exemplary embodiment of the present invention may include a rotary shaft 230, which operates as a rotational center of a rotor 220, may be arranged in the vertical direction of a vehicle to be perpendicular to the axial direction of wheels of the vehicle, and a flow passage 232 may be formed inside the rotary shaft 230 to move or guide cooling oil from the region below the rotor 220 through the flow passage 232 and may be sprayed to the region above the rotor 220 by centrifugal force generated by rotation of the rotor 220, thereby enhancing the motor-cooling effect.

As shown in FIGS. 4 and 5, a wound rotor motor 200 according to the second exemplary embodiment of the present invention may include a stator 210, a rotor 220, a rotary shaft 230, and a case 240. The motor may be configured to generate driving torque through rotation performed by electromagnetic force generated by the application of current thereto. The stator 210 may include a stator core 212 and a plurality of stator coils 214 wound around the stator core 212. The stator core 212 may include a plurality of coil-winding portions 212a arranged in the circumferential direction. Each of the stator coils 214 may be wound around a respective one of the coil-winding portions 212a.

The rotor 220 may include a rotor core 222 and a plurality of rotor coils 224 wound around the rotor core 222. The rotor core 222 may include a plurality of coil-winding portions 222a arranged in the circumferential direction. Each of the rotor coils 224 may be wound around a respective one of the coil-winding portions 222a. At this time, the stator 210 may be disposed inside the hollow case 240, and the rotor 220 may be disposed inside the stator 210 to be spaced a predetermined distance apart from the stator 210.

The rotary shaft 230 may operate as a rotational center of the rotor 220. In particular, the rotary shaft 230 may be fit into the inner circumferential surface of the rotor 220 (specifically, the inner circumferential surface of the rotor core) to rotate simultaneously with the rotor 220, and may extend straight (e.g., linearly) in the vertical direction of the vehicle when mounted to the vehicle. The case 240 may enclose the stator 210 and the rotor 220 to seal the stator 210 and the rotor 220 from the outside. The rotary shaft 230, which operates as the rotational center of the rotor 220, may penetrate the case 240 in the vertical direction and may be rotatably supported by the case 240.

The case 240 may enclose the stator coils 214, arranged longer in the vertical direction than the rotor coils 224, and thus, a predetermined gap may be formed in the vertical direction between the case 240 and the stator coils 214. A portion of the empty region above the rotor 220 within the case 240 may be referred to as a hollow space 242, and the empty region below the rotor 220 and the stator 210 may be referred to as an oil chamber 244 filled with cooling oil.

In addition, the rotary shaft 230 may include a flow passage 232 formed therein in the longitudinal direction thereof to allow the cooling oil to flow therethrough. The flow passage 232 may be formed at the center in the diametric direction of the rotary shaft 230 and may extend in the axial direction of the rotary shaft 230. A plurality of inlet ports 234, through which the cooling oil is introduced into the flow passage 232, and a plurality of outlet ports 236, through which the cooling oil is sprayed from the flow passage 232, may be connected to both ends in the longitudinal direction of the flow passage 232.

The inlet ports 234 may be embodied as passages that branch from the lower end of the flow passage 232, and the outlet ports 236 may be embodied as passages that branch from the upper end of the flow passage 232. Further, the respective inlet ports 234 extend from the lower end of the flow passage 232 to the outer circumferential surface of the rotary shaft 230 to communicate with the oil chamber 244, and the respective outlet ports 236 extend from the upper end of the flow passage 232 to the outer circumferential surface of the rotary shaft 230 to communicate with the hollow space 242.

Further, the inlet ports 234 may extend from the lower end of the flow passage 232 to the outer circumferential surface of the rotary shaft 230 in the radial direction (in the horizontal direction), and the outlet ports 236 may extend from the upper end of the flow passage 232 to the outer circumferential surface of the rotary shaft 230 in the upward diagonal direction to be inclined at a predetermined angle (an acute angle with respect to the longitudinal direction of the flow passage 232). This configuration enables the cooling oil to be smoothly raised and injected merely by centrifugal force generated by rotation of the rotary shaft 230 without an additional device.

As shown in FIG. 7, when the rotor 220 rotates, the rotary shaft 230 may be configured to rotate together with the rotor 220, and centrifugal force may be applied to the outlet ports 236. Accordingly, the cooling oil present in the upper portion of the flow passage 232 (i.e. the cooling oil introduced into the flow passage 232 through the inlet ports 234)

may move up to the outlet ports 236. Although centrifugal force is also applied to the inlet ports 234, which extend from the lower end of the flow passage 232 in the radial direction, since the inlet ports 234 are in the state of being immersed in the cooling oil stored in the oil chamber 244, the lower end of the flow passage 232 is in the state of being filled with the cooling oil. In particular, centrifugal force applied to the outlet ports 236 may move the cooling oil upwards.

The cooling oil, which moves up through the flow passage 232, may be sprayed from the outer circumferential surface of the rotary shaft 230 to the hollow space 242 through the outlet ports 236 in the radial direction since the distal ends of the outlet ports 236 may be arranged in the outer circumferential surface of the rotary shaft 230 in the circumferential direction. The hollow space 242 may be an empty space formed above the rotor 220 to communicate with the flow passage 232 through the outlet ports 236. The hollow space 242 may be sealed by an upper plate 250, which is provided above the rotor 220 to cover or enclose the same.

As shown in FIGS. 4 and 6, the upper plate 250 may be formed in the shape of a hollow cylinder that has an open bottom surface. The rotary shaft 230 may be fitted through a shaft-coupling aperture 254 formed in the top surface of the upper plate 250 such that the outer circumferential surface of the rotary shaft 230 is brought into contact with the circumferential surface of the shaft-coupling aperture 254. The upper plate 250 may include a plurality of oil discharge apertures 252, formed in the side surface thereof to be arranged in the circumferential direction. Each of the oil discharge apertures 252 formed in the side surface of the upper plate 250 may be disposed in a line that is perpendicular to the axial direction of the rotary shaft 230.

The upper plate 250 may include a plurality of latching protrusions 254a, which protrude from the circumferential surface of the shaft-coupling aperture 254 formed in the top surface of the upper plate 250 to come into contact with the outer circumferential surface of the rotary shaft 230. The rotary shaft 230 may include a plurality of latching recesses (not shown, refer to 132 in FIG. 2), formed in the outer circumferential surface thereof that comes into contact with the circumferential surface of the shaft-coupling hole 254. Each of the latching protrusions 254a of the upper plate 250 may be fitted into a respective one of the latching recesses in the rotary shaft 230. Since the upper plate 250 may be coupled to the rotary shaft 230 with each of the latching protrusions 254a fitted into a respective one of the latching recesses, the upper plate 250 may be configured to rotate together with the rotary shaft 230. In other words, the upper plate 250 may be coupled to the rotary shaft 230 to rotate together with the same through the above-described latching structure.

Referring to FIGS. 7 and 8, the cooling oil, which is radially sprayed from the rotary shaft 230 to the hollow space 242 through the outlet ports 236, may move toward the oil discharge apertures 252 by centrifugal force. The cooling oil that passes through the oil discharge apertures 252 may be discharged outside the upper plate 250 and return to the oil chamber 244 through the gaps between the stator coils 214 arranged in the circumferential direction of the stator 210 and through the gap between the stator 210 and the rotor 220, whereas the cooling oil that does not pass through the oil discharge apertures 252 falls toward the rotor 220 and returns to the oil chamber 244 through the gaps between the rotor coils 224.

The cooling oil that returns to the oil chamber 244 through the gaps between the stator coils 214 may cool the stator coils 214, and the cooling oil that returns to the oil chamber 244 through the gaps between the rotor coils 224 may cool the rotor coils 224. To increase the contact area between the cooling oil that falls toward the rotor 220 and the rotor coils 224, the upper plate 250 has a guide rib 256, which protrudes from the side surface thereof and is disposed below the oil discharge apertures 252 to guide the cooling oil that does not pass through the oil discharge apertures 252 toward the rotor coils 224.

In other words, of the cooling oil sprayed from the rotary shaft 230 to the hollow space 242, the cooling oil that is not discharged through the oil discharge apertures 252 and falls toward the rotor 220 may be guided by the guide rib 256 to fall closer to the rotor coils 224. The guide rib 256 may protrude in the horizontal direction that is perpendicular to the axial direction of the rotary shaft 230; however, the exemplary embodiment is not limited thereto. For example, the guide rib 256 may be formed to be inclined downwards toward the rotor 220.

The guide rib 256 may be formed to have a flat ring shape, i.e. a closed-loop shape that is continuously formed along the side surface of the upper plate 250; however, the exemplary embodiment is not limited thereto. The guide rib 256 may be split into a plurality of pieces, which are arranged in the circumferential direction of the upper plate 250 to correspond to the positions of the respective rotor coils 224.

Meanwhile, of the lower coil portions 214a of the stator 210 and the lower coil portions 224a of the rotor 220 disposed in the oil chamber 244, only the lower coil portions 214a of the stator 210 may be immersed in the cooling oil in the oil chamber 244 to minimize the rotation resistance of the rotor 220 due to the cooling oil. The lower coil portions 214a of the stator 210 may protrude downward further than the lower coil portions 224a of the rotor 220.

The configuration may also be made such that the lower coil portions 224a of the rotor 220 are immersed in the cooling oil in the oil chamber 244 together with the lower coil portions 214a of the stator 210. However, to minimize the rotation resistance and the frictional loss of the rotor 220 due to the cooling oil, to enhance the effect of cooling the stator 210 using the cooling oil, and to minimize an increase in the weight of the vehicle due to the cooling oil that is supplied to the oil chamber 244, it is desirable to form a configuration such that only the lower coil portions 214a of the stator 210 are immersed in the cooling oil in the oil chamber 244.

In other words, the cooling oil may be supplied to the oil chamber 244 to a height at which only the lower coil portions 214a of the stator 210, rather than both the lower coil portions 214a of the stator 210 and the lower coil portions 224a of the rotor 220, are immersed in the cooling oil. Since it is possible to enhance the effect of cooling the rotor 220 using the cooling oil sprayed through the flow passage 232, to decrease the rotational loss of the rotor 220, the cooling oil may be supplied to the oil chamber 244 to a height at which only the lower coil portions 214a of the stator 210 are immersed in the cooling oil.

In the wound rotor motor 200 of the present invention configured as described above, since the cooling oil circulates due to centrifugal force, it may be possible to eliminate an oil pump for moving and spraying the cooling oil to the region above the rotor 220. Further, it may be possible to maximize the motor-cooling effect by cooling all of the rotor coils 224 and the stator coils 214 arranged in the circumferential direction. Furthermore, the frictional loss of the rotor 220 due to the cooling oil may be decreased, thereby improving the operational efficiency of the motor.

As is apparent from the above description, according to a wound rotor motor according to the first exemplary embodiment of the present invention, a rotary shaft may be arranged in the vertical direction to immerse a plurality of lower coil portions of a stator and a rotor in cooling oil, thereby improving the cooling effect beyond that of a conventional configuration, in which lower coil portions are partially immersed in the cooling oil, cooling the rotor to a desired level by circulating an amount of cooling oil less than that pumped by an oil pump used in a conventional wound rotor motor, in which a rotary shaft is arranged in the horizontal direction, and consequently making it possible to decrease the capacity of an oil pump for pumping and spraying the cooling oil.

According to a wound rotor motor according to the second exemplary embodiment of the present invention, a rotary shaft may be arranged in the vertical direction and has therein a flow passage, through which cooling oil that is present in the region below a rotor may move up and may be sprayed to the region above the rotor by centrifugal force generated by rotation of the rotor, thereby making it possible to eliminate an oil pump for spraying the cooling oil to the region above the rotor, to maximize the motor-cooling effect, to decrease the frictional loss of the rotor due to the cooling oil, and consequently to improve the operational efficiency of the motor.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A wound rotor motor for a vehicle to generate driving torque through rotation of a rotor performed by electromagnetic force generated between the rotor and a stator, the wound rotor motor comprising:
    a rotary shaft arranged in a vertical direction of a vehicle, the rotary shaft operating as a rotational center of the rotor;
    a flow passage formed in the rotary shaft in a longitudinal direction of the rotary shaft;
    cooling oil for cooling the motor, the cooling oil being guided through the flow passage and sprayed to a hollow space above the rotor only by centrifugal force generated by rotation of the rotary shaft;
    at least one inlet port formed in the rotary shaft to introduce the cooling oil into the flow passage;
    a plurality of outlet ports formed in the rotary shaft to discharge the cooling oil from the flow passage, wherein the outlet ports branch from an upper end of the flow passage and extend to an outer circumferential surface of the rotary shaft, and the outlet ports extend from the upper end of the flow passage to be inclined in an upward diagonal direction; and
    an oil chamber disposed below the stator and the rotor to store the cooling oil therein, the oil chamber configured to communicate with the inlet port,
    wherein the cooling oil is stored in the oil chamber to a predetermined height to immerse a lower end portion of each of a plurality of stator coils in the cooling oil, and
    wherein the at least one inlet port extends from a lower end of the flow passage in a radial direction, and is in a state of being immersed in the cooling oil stored in the oil chamber, such that the centrifugal force is applied to the outlet ports so as to move the cooling oil upwards.

2. The wound rotor motor of claim 1, further comprising:
    an upper plate disposed above the rotor to cover the hollow space, the upper plate having therein a plurality of oil discharge apertures.

3. The wound rotor motor of claim 2, wherein each of the oil discharge apertures is formed in the upper plate to be disposed in a line perpendicular to an axial direction of the rotary shaft.

4. The wound rotor motor of claim 3, wherein the upper plate has a guide rib disposed below the oil discharge apertures, and wherein, of the cooling oil sprayed from the flow passage to the hollow space, cooling oil that is not discharged outside the upper plate through the oil discharge apertures is guided toward rotor coils of the rotor by the guide rib.

* * * * *